(12) United States Patent
Ase et al.

(10) Patent No.: US 6,677,544 B2
(45) Date of Patent: Jan. 13, 2004

(54) SWITCH PANEL DEVICE IN A SADDLE TYPE VEHICLE

(75) Inventors: Yukimi Ase, Saitama (JP); Yoji Kanaoka, Saitama (JP); Koichi Shimamura, Saitama (JP); Koji Kano, Saitama (JP); Yoshifumi Mochizuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/796,349

(22) Filed: Mar. 2, 2001

(65) Prior Publication Data

US 2001/0022265 A1 Sep. 20, 2001

(30) Foreign Application Priority Data

Mar. 3, 2000 (JP) ........................................ 2000-059389

(51) Int. Cl.7 ................................................. H01H 9/06
(52) U.S. Cl. ...................................... 200/61.54; 200/54
(58) Field of Search ............................... 200/61.54, 5 A

(56) References Cited

U.S. PATENT DOCUMENTS

| | | | | |
|---|---|---|---|---|
| 4,565,909 A | * | 1/1986 | Yashima et al. | 200/61.54 X |
| 4,638,131 A | * | 1/1987 | Kidd et al. | 200/5 A X |
| 6,225,584 B1 | * | 5/2001 | Ase et al. | 200/61.54 |

FOREIGN PATENT DOCUMENTS

JP  719975  5/1995

* cited by examiner

Primary Examiner—Renee Luebke
(74) Attorney, Agent, or Firm—Birch, Stewart, Kolasch & Birch, LLP

(57) ABSTRACT

A switch panel device permitting the mounting of a larger number of switches together on a steering handle pipe is disclosed that improves operability and operator comfort and safety. Plural switches are arranged on columns and/or on stages. An indicating and warning switch group having higher urgency and frequency of use than remaining switch elements are allocated to a column which is located nearest a handle bar grip. Further, the indicating and warning switch group is also allocated to a first horizontal stage which is set on a horizontal line coincident with a handle pipe and into additional stages positioned adjacent to the first horizontal stage in vertical distribution.

12 Claims, 3 Drawing Sheets

SWITCH PANEL DEVICE IN A SADDLE TYPE VEHICLE

BACKGROUND OF THE INVENTION

1. Field of the Invention

The present invention relates to a switch panel device in a saddle type vehicle, and more particularly to a switch panel device mounted on a steering handle pipe and having plural switches concentrated thereon so as to permit a rider of the vehicle to conveniently operate switches.

2. Background Art

In a saddle type vehicle having a saddle which a rider straddles, such as a large-sized two-wheeled motor vehicle or a three-wheeled vehicle, operating switches are sometimes disposed on a steering handle pipe so that the rider can operate the switches easily.

FIG. 5 is a perspective view showing an example of a conventional handle switch device. In the same figure, a switch body 200 is mounted on a steering handle pipe adjacent to a left handle grip 14. Indicating and warning switches such as a dimmer switch 201, a blinker switch 202, a horn switch 203, and a hazard switch 204 are provided in the switch body 200.

An audio switch unit 300 is disposed independently and above the switch body 200. The audio switch unit 300 includes a channel selecting switch 301 and a muting switch 302. A similar switch device is disclosed, for example, in Japanese Utility Model Laid-Open No.7-19975.

FIG. 6 is a perspective view showing another example of a conventional handle switch device. In the same figure, a switch panel 400 is provided separately from a switch body 200, and an audio switch 401 and a switch 402 for CB radio communication are provided on the switch panel 400 to meet a demand for an increase in the number of switches.

As shown in FIG. 6, if switches are stacked upwardly, the operability of the top-stage switch will be deteriorated with an increase in the number of switches. More particularly, in a state in which the rider grasps the grip 14, it is difficult for a finger of the rider's left hand LH to reach the switch 402 for CB located at the top stage. Moreover, the audio switch 401 and the switch 402 for CB are often used in shapes similar to each other because both include similar functions such as volume control. Therefore, in the example shown in FIG. 6 in which they are arranged side by side, it is not easy to distinguish one from the other, thus resulting in deterioration of operability.

SUMMARY OF THE INVENTION

The present invention overcomes the shortcomings associated with the related art and achieves other advantages not realized by the related art.

It is an object of the present invention to provide a switch panel device in a saddle type vehicle capable of solving the above-mentioned problems, enhancing the degree of integration of switches, facilitating the recognition of many switches and thereby attaining the improvement of operability of switch functions.

These and other objects are accomplished by a switch panel device for a saddle type vehicle, the switch panel device disposed near a steering handle grip of the vehicle, the switch panel device comprising a plurality of switch operating elements disposed on an operating surface, wherein the switch operating elements are arranged separately in a plurality of vertical columns on the operating surface; and the switch operating elements consist of a set of vehicular indicating and warning system operating elements and at least one remaining set of additional switch operating elements, wherein the vehicular indicating and warning system operating elements are arranged in a first column closest to the steering handle grip and each remaining set of additional switch operating elements are arranged in additional columns farther from the handle grip.

According to a first feature of the invention, since switch operating elements for an indicating and warning system, which require higher urgency and frequency of use, are allocated in a column positioned closest to the handle grip, it is possible to effect urgent operations or frequent operations in a more efficient manner.

These and other objects are also accomplished by a switch panel device for a saddle type vehicle, the switch panel device disposed near a steering handle grip of the vehicle, the switch panel device comprising a plurality of switch operating elements disposed on an operating surface, wherein the switch operating elements are arranged separately in at least four horizontal stages, the at least four horizontal stages include a first stage arranged vertically on a horizontal line passing through a handle pipe for the steering handle grip, a the second stage in a position arranged adjacent to and vertically above the first stage, and a third stage in a position arranged adjacent to and vertically below the first stage; and the switch operating elements include of a set of vehicular indicating and warning system operating elements and at least one remaining set of additional switch operating elements, wherein the set of vehicular indicating and warning system operating elements are arranged in the first stage, the second stage and the third stage.

According to the second feature of the invention, when a vehicle driver is going to operate a switch operating element for the indicating and warning system, all that is required of a rider is a mere extension of his or her thumb horizontally while still safely grasping the handle grip.

These and other objects are further accomplished by a switch panel device for a saddle type vehicle, the switch panel device disposed near a steering handle grip of the vehicle, the switch panel device comprising a plurality of switch operating elements disposed on an operating surface, wherein the switch operating elements are arranged separately in a plurality of vertical columns on the operating surface and horizontally in a plurality of horizontal stages; the switch operating elements include of a set of vehicular indicating and warning system operating elements, a set of audio system operating elements and a set of radio communication system operating elements, wherein the set of vehicular indicating and warning system operating elements are arranged in a first column closest to the steering handle grip; and the switch operating elements for the audio system and the radio communication system are arranged in a remote column and a remote stage, said remote column and said remote stage positioned farthest from the steering handle grip with respect to the respective plurality of vertical columns and horizontal stages.

According to the third feature of the invention, since the switch operating elements for the audio system(s) whose urgency and frequency of use are relatively low are allocated to positions remote from the handle grip, the switch operating elements for the indicating and warning system, whose importance is relatively high, are allocated to a position closer to the handle grip. Therefore, even where a large number of switch operating elements are disposed, it is possible to utilize the operating surface of the switch panel efficiently and thereby ensure satisfactory operability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the present invention will be described in detail with reference to the accompanying drawings.

Figure 4:
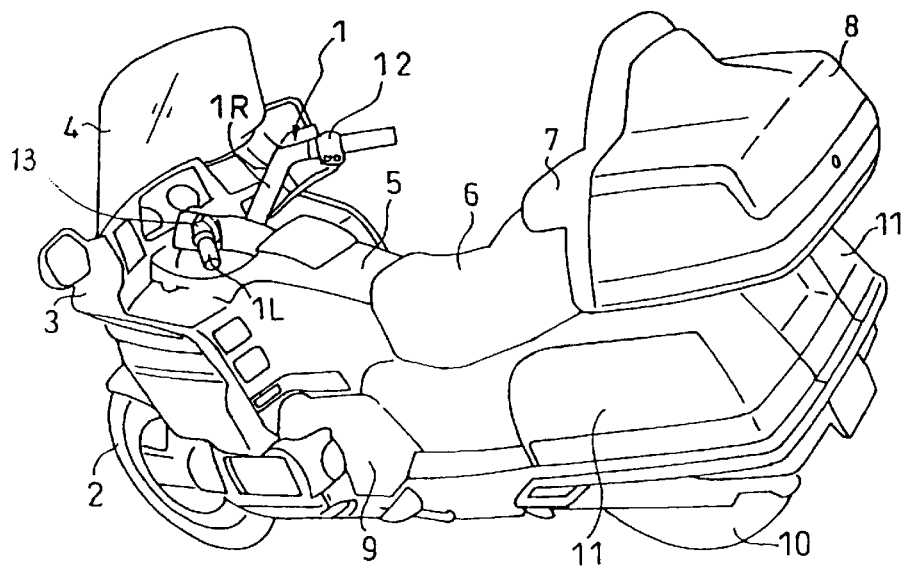
FIG. 4 is a perspective view of a motor vehicle with a switch panel device according to an embodiment of the present invention.
Figure 5:
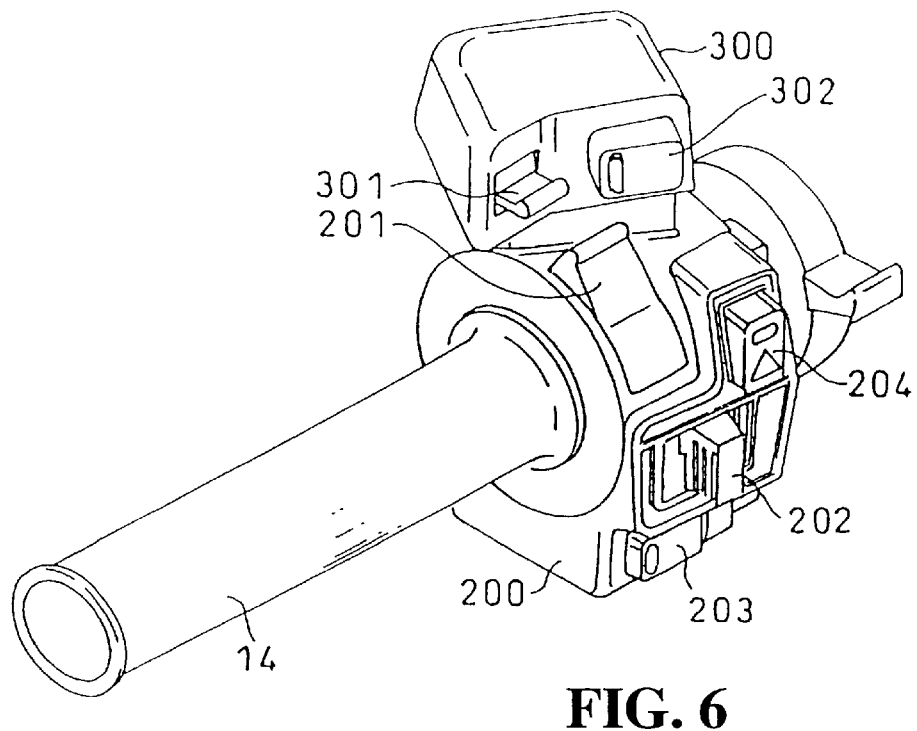
FIG. 5 is a perspective view of a conventional handle switch.
Figure 6:
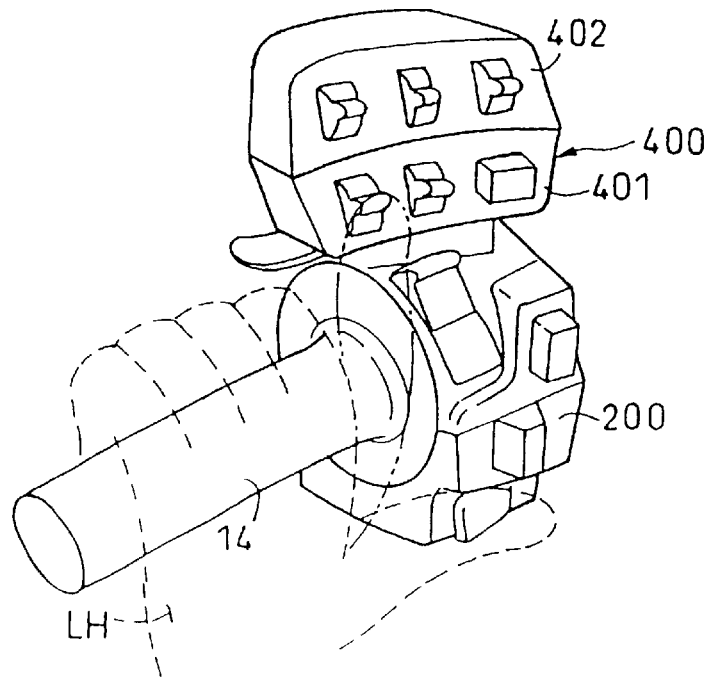
FIG. 6 is a perspective view of another example of a conventional handle switch.

FIG. 4 is a perspective view of a two-wheeled motor vehicle having a switch panel device according to an embodiment of the present invention. In the same figure, a steering handle 1 is fixed to an upper portion of a front fork (not shown) whose lower end is engaged with a front wheel 2. The steering handle 1 is a separate type handle comprising a left handle 1L and a right handle 1R.

In front of the steering handle 1 is mounted a front fairing 3 which covers a display panel and a lamp device. A windscreen 4 is mounted on top of the front fairing 3.

A right switch panel 12 is disposed near a grip of the right handle 1R and is provided with a starter, a reverse switch and a reverse shift switch. A left switch panel 13 includes a group of indicating and warning switches, a group of audio switches, and a group of switches for CB. The left switch panel 13 is disposed near a grip of the left handle 1L. The audio switches are for operating a radio, a CD player, and a tape deck.

A fuel tank 5, a rider seat 6, a fellow passenger seat 7, and a rear box 8 are disposed in this order from the front fairing 3 toward the rear of the vehicle body. An engine 9 is mounted below the fuel tank 5. A rear wheel 10 and side boxes 11 are mounted below the rear box 8 so as to cover the right and left sides of an upper portion of the rear wheel 10.

Figure 1:
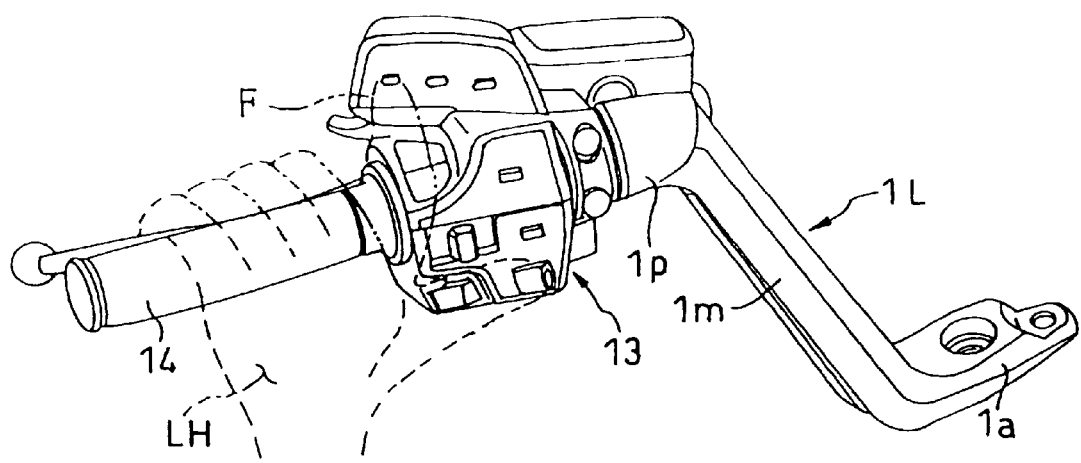
FIG. 1 is a perspective view of a left steering handle of a motor vehicle which includes a switch panel device according to an embodiment of the present invention.
Figure 2:
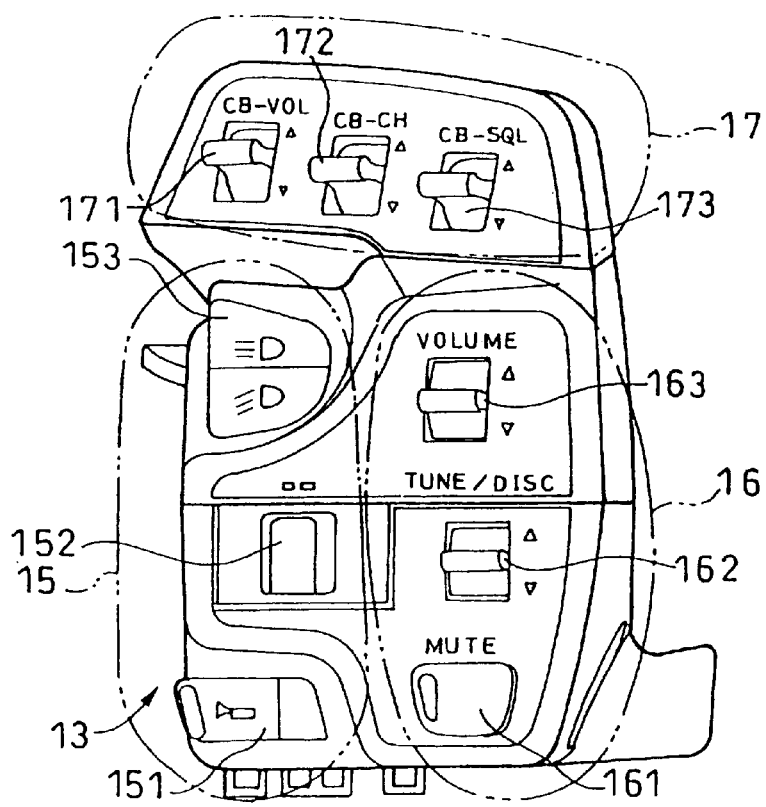
FIG. 2 is a front view of a switch panel device according to an embodiment of the present invention.

A detailed description will now be given about the left switch panel 13 mounted on the left handle 1L. FIG. 1 is a perspective view of a left steering handle of a motor vehicle which includes a switch panel device according to an embodiment of the present invention. FIG. 2 is a front view of a switch panel device according to an embodiment of the present invention.

In FIG. 1, the left handle 1L is made up of a mounting portion 1a fixed to a top bridge (not shown), an intermediate portion 1m extending obliquely left-wards from the mounting portion 1a, and a handle pipe portion 1p extending further left-wards and nearly horizontally from the intermediate portion 1m. A handle grip 14 is provided on a left-hand side of the handle pipe portion 1p. The left switch panel 13 is disposed adjacent the handle grip 14 on the handle pipe portion 1p so that the rider can easily operate the left switch panel with his or her left hand LH while grasping the handle grip 14.

In FIG. 2, an indicating and warning switch group 15 is disposed on the front left side of the left switch panel 13 in the column closest to the handle grip 14. The indicating and warning switch group 15 includes a horn switch 151 positioned at the lowest stage, an overlying blinker switch 152, and a dimmer switch 153. An audio switch group 16 is disposed on the right side of the indicating and warning switch group 15 in a column positioned away from the handle grip 14. The audio switch group includes a muting switch 161 positioned at the lowest stage, an overlying channel selecting switch 162, and an overlying volume control 163.

Above the indicating and warning switch group 15 and the audio switch group 16 is further disposed a switch group 17 for CB. The CB switch group 17 includes a CB volume control 171, a CB channel switch 172, and a CB squelch switch 173. As seen in FIG. 1, an operating surface of the CB switch group 17 is arranged in a position turned slightly clockwise when viewed in plan with respect to operating surfaces of the other switch groups 15 and 16. The operating surface of the CB switch group 17 is positioned with an inclination in the direction of the handle grip 14. This inclination facilitates an arcuate motion of a finger F when only the finger F is moved while the left hand LH remains fixed to the grip handle 14.

Figure 3:
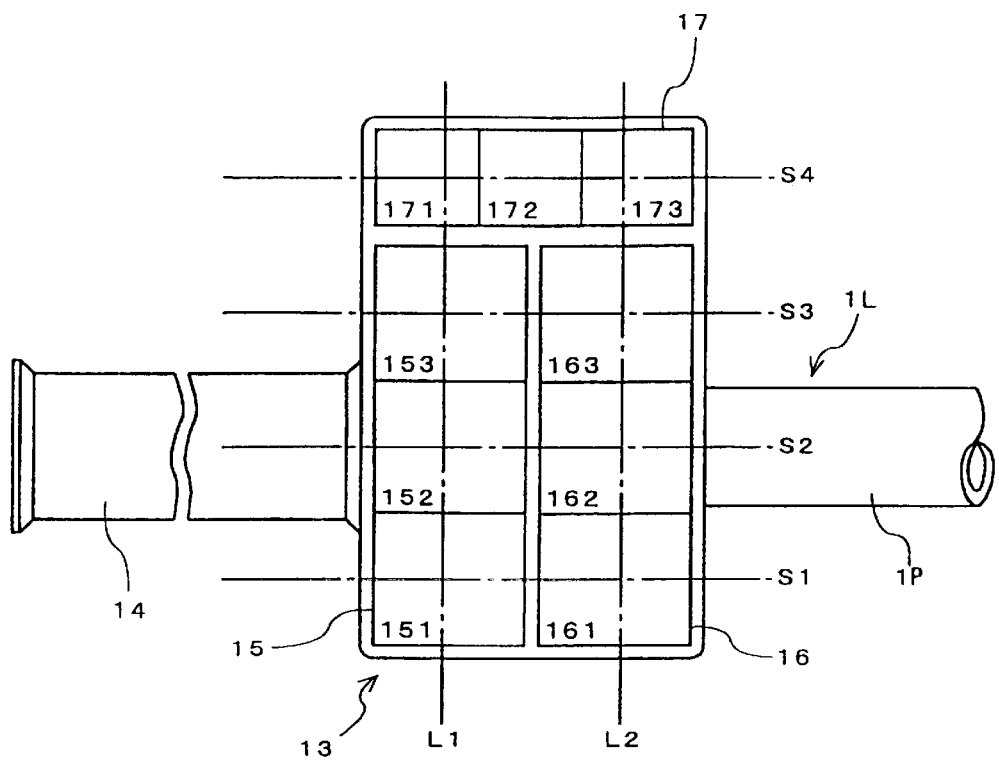
FIG. 3 is a schematic view showing an arrangement of switch operating elements on a switch panel device according to an embodiment of the present invention.

FIG. 3 is a schematic view showing an arrangement of switch operating elements on a switch panel device according to an embodiment of the present invention. In FIG. 3, switches are arranged vertically in two columns and horizontally in four stages or rows. These columns ands stages include a column L1 closest to the handle grip 14, a column L2 away from the handle grip 14, and stages S1, S2, S3, and S4 in a preferred embodiment. Of these stages, the stage S2 is set on a horizontal line passing through the handle pipe portion 1p, and the other stage S1 and stages S3, S4 are set respectively below and above the stage S2.

The indicating and warning switch group 15 whose frequency of operation is high is disposed on column L1 and the audio switch group 16 whose frequency of operation is presumed to be lower is disposed on the column L2. The CB switch group 17 is disposed on the stage S4. Further, the indicating and warning switch group 15 and the audio switch group 16 are disposed on the stages S1 and S3 below and above the stage S2.

Thus, the switches of the indicating and warning switch group 15 are concentrated near the handle grip 14. When a quick motion is required, for example, when providing a turning signal at a time of frequent direction changing or giving a warning in an emergency, it is easy for the vehicle rider to extend his or her thumb and operate the switch concerned while still grasping the handle grip 14.

Since the switch groups 15 to 17 are each arranged in a horizontal row or vertical column, their switches can be identified easily. Particularly, since the audio switch group 16 is disposed vertically and the CB switch group 17 is disposed horizontally, even when the respective switches are similar in shape, it is possible to more easily distinguish between both respective switch groups. Therefore, inadvertent switch operation is avoided.

Since a plurality of switch operating elements are arranged separately in columns or stages, it is easy to distinguish them from one another and hence their operability is improved.

Since switch operating elements for the indicating and warning system, which require urgency and whose frequency of use is high, are allocated to the column closest to the handle grip, it is possible to easily perform a required motion in an emergency or perform frequent operations.

When the switch operating elements for the indicating and warning system are to be operated, all that is required is a mere extension of the rider's thumb horizontally while grasping the handle grip. The rider's thumb can reach and operate the switch operating elements which are concentrated in that horizontal position.

Since the switch operating elements for the audio system and radio communication system are relatively low in urgency and frequency of use, these same switch operating elements are arranged in a position remote from the handle grip. The switch operating elements for the indicating and warning system whose importance is high are allocated relatively close to a position nearest the handle grip. Therefore, even where a large number of switch operating elements are arranged, it is possible to utilize the operating surface of the switch panel effectively and ensure satisfactory operability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switch panel device for a saddle vehicle, said switch panel device disposed near a steering handle grip of the vehicle, said switch panel device comprising:

a plurality of switch operating elements disposed on an operating surface, wherein said switch operating elements are arranged separately in a plurality of vertical columns on said operating surface;

said switch operating elements include a set of vehicular indicating and warning system operating elements and at least one remaining set of additional switch operating elements, wherein said vehicular indicating and warning system operating elements are arranged in a first column closest to said steering handle grip and each remaining set of additional switch operating elements are arranged in additional columns farther from said handle grip, wherein said switch operating elements are arranged separately in at least four horizontal stages, the at least four horizontal stages including a first stage arranged along a horizontal line passing through a handle pipe for said steering handle grip, a second stage in a position arranged adjacent to and vertically above said first stage, and a third stage in a position arranged adjacent to and vertically below said first stage, and said vehicular indicating and warning system operating elements including operating elements having a high frequency of use and operating elements being utilized for emergency situations, said operating elements having the high frequency of use and said operating elements being utilized for emergency situations include a blinker switch and a horn switch, respectively.

2. The switch panel device according to claim 1, wherein said set of vehicular indicating and warning system operating elements are arranged in said first horizontal stage, said second horizontal stage and said horizontal third stage.

3. The switch panel device according to claim 2, wherein said at least one remaining set of additional switch operating elements includes a set of CB operating element controls, said at least one remaining set being arranged in a fourth horizontal stage.

4. The switch panel device according to claim 3, wherein the indicating and warning system operating elements include the horn switch, the blinker switch, and a dimmer switch.

5. The switch panel device according to claim 4, wherein a set of audio switch operating elements are disposed in a column adjacent to said first column and away from the handle grip.

6. The switch panel device according to claim 5, wherein said set of audio switch operating elements include a muting switch, a channel selecting switch, and a volume control switch.

7. The switch panel device according to claim 1, wherein the indicating and warning system operating elements include the horn switch, the blinker switch, and a dimmer switch.

8. The switch panel device according to claim 7, wherein a set of audio switch operating elements are disposed in a column adjacent to said first column and away from the handle grip.

9. The switch panel device according to claim 8, wherein said set of audio switch operating elements include a muting switch, a channel selecting switch, and a volume control switch.

10. A switch panel device for a saddle vehicle, said switch panel device disposed near a steering handle grip of the vehicle, said switch panel device comprising:

a plurality of switch operating elements disposed on an operating surface, wherein said switch operating elements are arranged separately in at least four horizontal stages, the at least four horizontal stages include a first stage arranged along a horizontal line passing through a handle pipe for said steering handle grip, a second stage in a position arranged adjacent to and vertically above said first stage, and a third stage in a position arranged adjacent to and vertically below said first stage;

said switch operating elements include of a set of vehicular indicating and warning system operating elements and at least one remaining set of additional switch operating elements, wherein said set of vehicular indicating and warning system operating elements are arranged in said first stage, said second stage and said third stage, and said vehicular indicating and warning system operating elements including operating elements having a high frequency of use and operating elements being utilized for emergency situations, wherein said operating elements having the high frequency of use and said operating elements being utilized for emergency situations include a blinker switch and a horn switch, respectively.

11. The switch panel device according to claim 10, wherein each remaining set of additional switch operating elements are arranged in at least one additional stage exclusive from said first, second and third stages.

12. A switch panel device for a saddle vehicle, said switch panel device disposed near a steering handle grip of the vehicle, said switch panel device comprising:

a plurality of switch operating elements disposed on an operating surface, wherein said switch operating elements are arranged separately in a plurality of vertical columns on said operating surface and horizontally in a plurality of horizontal stages;

said switch operating elements include of a set of vehicular indicating and warning system operating elements, a set of audio system operating elements and a set of radio communication system operating elements, wherein said set of vehicular indicating and warning system operating elements are arranged in a first column closest to said steering handle grip;

the switch operating elements for the audio system and the radio communication system are arranged in a remote column and a remote horizontal stage, said remote column and said remote stage positioned farthest from said steering handle grip with respect to the respective plurality of vertical columns and horizontal stages; wherein said set of audio switch operating elements includes a muting switch, a channel selecting switch, and a volume control switch;

at least one remaining set of additional switch operating elements including a set of CB operating element controls, said at least one remaining set being arranged in a fourth horizontal stage, and said vehicular indicating and warning system operating elements including operating elements having a high frequency of use and operating elements being utilized for emergency situations, wherein said operating elements having the high frequency of use and said operating elements being utilized for emergency situations include a blinker switch and a horn switch, respectively.

* * * * *